US011026399B2

(12) United States Patent
Leggett et al.

(10) Patent No.: US 11,026,399 B2
(45) Date of Patent: Jun. 8, 2021

(54) AUTOMATED ANIMAL FEEDING SYSTEM AND METHOD OF USE

(71) Applicant: Game Country Inc., Albany, GA (US)

(72) Inventors: Terry Leggett, Fort, TX (US); George William Estep, II, Arlington, TX (US); Robert Allen Hatcherson, Fort Worth, TX (US)

(73) Assignee: Game Country Inc., Albany, GA (US)

( * ) Notice: Subject to any disclaimer, the term of this patent is extended or adjusted under 35 U.S.C. 154(b) by 516 days.

(21) Appl. No.: 16/035,396

(22) Filed: Jul. 13, 2018

(65) Prior Publication Data

US 2019/0014742 A1    Jan. 17, 2019

Related U.S. Application Data

(60) Provisional application No. 62/532,818, filed on Jul. 14, 2017.

(51) Int. Cl.
*A01K 5/02* (2006.01)
*G01S 19/14* (2010.01)

(52) U.S. Cl.
CPC .......... *A01K 5/0291* (2013.01); *A01K 5/0275* (2013.01); *G01S 19/14* (2013.01)

(58) Field of Classification Search
CPC ..... G01S 19/14; A01K 5/0291; A01K 39/012; A01K 39/0206; A01K 39/026; A01K 61/80; A01K 5/0225; A01K 5/0275; A01K 31/22; A01K 5/01
USPC .......... 119/51.11, 51.04, 230, 72, 56.1, 57.1, 119/52.1, 54, 57.91, 57.92
See application file for complete search history.

(56) References Cited

U.S. PATENT DOCUMENTS

| | | | | |
|---|---|---|---|---|
| 3,678,902 A * | 7/1972 | Ruth | ..................... | A01K 5/0291 119/51.11 |
| 4,747,525 A * | 5/1988 | Pennington | .......... | A01K 5/0291 119/51.11 |
| 4,989,547 A * | 2/1991 | Eaton | ................... | A01K 5/0291 119/51.11 |
| 5,926,441 A * | 7/1999 | Zinsmeyer | ........... | A01K 5/0291 222/368 |
| 8,573,156 B2 * | 11/2013 | Gates | ................... | A01K 5/0225 119/53 |
| 10,856,521 B1 * | 12/2020 | Thorngren | ......... | G05B 19/0426 |
| 2011/0197819 A1 * | 8/2011 | Montgomery | ....... | A01K 5/0225 119/51.11 |
| 2015/0327510 A1 * | 11/2015 | Romero | .................. | A01K 7/02 119/51.11 |
| 2017/0105388 A1 * | 4/2017 | Pfeiff | ................... | A01K 5/0291 |
| 2018/0300662 A1 * | 10/2018 | Lauve, IV | ........... | A01K 5/0291 |

* cited by examiner

*Primary Examiner* — Yvonne R Abbott-Lewis

(57) ABSTRACT

Disclosed herein are various aspects of animal feeders and animal feeding systems. In one aspect, the animal feeding system includes: (1) a container for receiving feed therein, (2) a sensor, (3) a controller, (4) a communications module coupled with the controller and configured for both short-range and long-range communication with at least one user interface and the at least one sensor, (5) a dispenser for dispensing feed, and (6) a gate connected with a motor, the gate for controlling the flow of food from the container to the dispenser, the gate controlled by a motor, wherein the controller is configured to automatically regulate feeding times according to the location of the animal feeding system and the corresponding sunrise and sunset times of the location.

16 Claims, 5 Drawing Sheets

AUTOMATED ANIMAL FEEDING SYSTEM AND METHOD OF USE

CROSS REFERENCE TO RELATED APPLICATION

This application claims priority to U.S. Provisional Patent Application No. 62/532,818, filed on Jul. 14, 2017, entitled "AUTOMATED REMOTE ANIMAL FEEDING SYSTEM AND METHOD OF USE," the entire content which is incorporated herein by reference.

FIELD OF THE DISCLOSURE

This application is related to automated feeders, and, more specifically, to automated feeding systems.

BACKGROUND

Feeders are used to feed all types of animals, including livestock, wild or game animals (such as deer), domestic animals, captured animals (such as at a zoo), and other various types of animals. The feeders typically include a hopper connected to a mechanical spreader that is usually driven by an electric motor connected to a storage battery. The hopper stores feed for the animals, such as corn for deer. Certain animal feeders are controlled by a timer that automatically operates the motor for feeding at certain times during a day.

SUMMARY

In one aspect, an animal feeding system is disclosed. In one embodiment, the animal feeding system includes: (1) a container for receiving feed therein, (2) a sensor, (3) a controller, (4) a communications module coupled with the controller and configured for both short-range and long-range communication with at least one user interface and the at least one sensor, (5) a dispenser for dispensing feed, and (6) a gate connected with a motor, the gate for controlling the flow of food from the container to the dispenser, the gate controlled by a motor, wherein the controller is configured to automatically regulate feeding times according to the location of the animal feeding system and the corresponding sunrise and sunset times of the location.

In another aspect, a resource management system for controlling multiple animal feeding systems is disclosed. In one embodiment, the resource management system includes: (1) a communications interface configured to communicate with controllers of multiple animal feeding systems, wherein each of the multiple animal feeding systems has a unique location, and (2) a processor configured to direct the controllers to automatically regulate feeding times according to each unique location and the corresponding sunrise and sunset times of the unique location.

In still yet another aspect, a computer program product having a set of operating instructions stored on a computer readable medium that direct operation of at least one animal feeding system is disclosed. In one embodiment, the instructions include: (1) receiving a location of an animal feeding system, (2) receiving feeding settings for the animal feeding system that include a feeding speed and a feeding rate, (3) determining sunrise and sunset for the location employing global positioning data, and (4) automatically providing feed at the animal feeding system based on the sunrise and sunset and the feeding settings.

BRIEF DESCRIPTION

Reference is now made to the following descriptions taken in conjunction with the accompanying drawings, in which.

DETAILED DESCRIPTION

Figure 1:
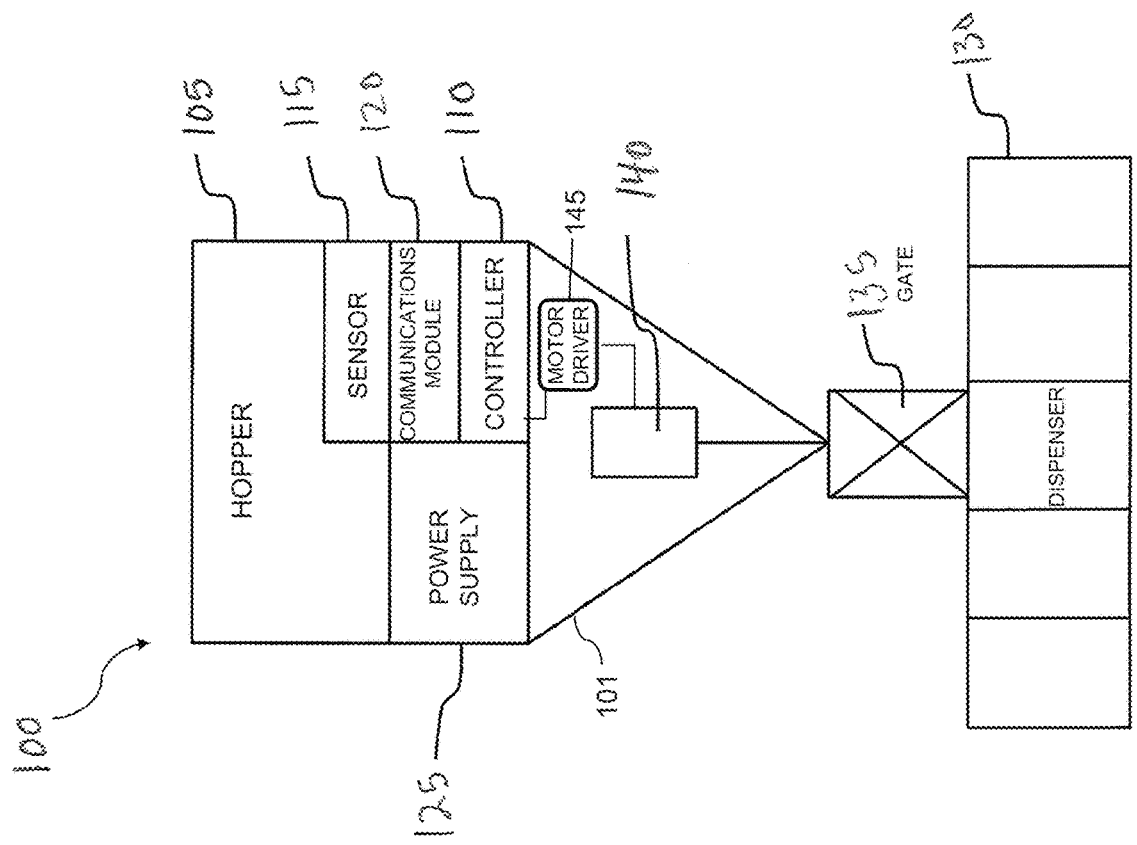
FIG. 1 illustrates an automated anima feeding system constructed according to principles of the disclosure.

As noted above some animal feeders may have timers that enable a user to set certain times of day for feeding wherein an animal may retrieve food or the animal feeder may dispense food. For example, deer feeders set in the woods may be optimal to dispense food at sunrise and sunset. However, setting an arbitrary time for sunrise and sunset does not guarantee feeding at sunrise and sunset since these times are constantly changing through the seasons and may vary by physical location and topography. For example, while Jackson, Miss., and Fort Worth, Tex., may both be in the Central time zone, sunrise and sunset times will certainly vary for these two locations since Fort Worth is located considerably west of Jackson. As such, sunrise and sunset times for Fort Worth will be at a later time compared to Jackson.

Animal feeders also require physical access to refill feed and perform routine maintenance as needed. Often, animal feeders may be placed in a remote location, where physical access is difficult and time consuming. Additionally, there may be multiple animal feeders that, even if access is relatively easy, require considerable time to reach and check all of them.

Accordingly, what is needed is an automated animal feeder having a sophisticated timing system for feeding and remote status functionality. The timing system is configured to allow accurate setting of feeding times by a user, both at the system location and by remote access from a user interface. The remote status functionality is configured to allow the user to verify feed level and other system information about the feeder without having to travel to the animal feeder.

As such, disclosed herein are various aspects of an animal feeding system having a timing system that automatically feeds based on the unique physical location of the animal feeding system. The timing system includes a controller that operates the animal feeding system using the actual physical location of the animal feeding system as determined by a global positioning device.

Sunrise and sunset times mange every day and can swing up to 1.5 hours and the length of day varies over 4 hours in a year, as well as changes due to daylight savings time. Sunrise and sunset times vary depending on global location so the controller determines its location, by using a global positioning service (GPS) device. The global position may be preprogrammed into the controller, or may be updated via a remote server connected with the controller.

Thus, the controller can accurately provide solar-based feeding for each unique physical location of an animal feeding system. The controller can also employ a sensor or sensors to assist in determining the feeding time for each unique location. For example, the controller can employ a photo sensor to adjust a feeding time for a unique location due to shade from trees or clouds. Thus, the controller can employ both global positioning and lighting conditions when determining feeding times.

In one aspect, the controller replaces traditional digital timers used in traditional feeders and as such, can provide more accurate feeding times, based on physical location and information received from a sensor and through a communication module when initiating feeding times and a feeding schedule.

The controller can employ a universal schedule based on sunrise and sunset. Accordingly, controllers for multiple animal feeding systems positioned in diverse locations can be set for a feeding time of sunrise and sunset and feed at different times based on the physical location of each of the animal feeding systems. In one embodiment, an algorithm may be programmed into the controller to provide perpetual sunrise and sunset data based on GPS data. The animals may be fed by the feeder with the feeding time schedules naturally adjusted based on the actual start, length, and end of each day based on the physical location of the animal feeding system. Thus, the sunrise and sunset times for each of the feeding systems can be adjusted each day. In one example, the animal feeding system may be implemented with fishery feeders that feed the fish, in one implementation, an hour after sunrise or an hour before sunset. Other examples include zoo feeders that feed at a regular schedule and without having a reset a traditional digital timer. In addition to animal feeding systems, the controller disclosed herein can be used in crop watering systems that water the crops from sunrise until an hour after sunrise. Additional examples where the controller may be used include park gates with a controlled schedule of being open from 30 minutes before sunrise until 30 minutes after sunset.

A communication module operatively coupled with the controller is configured to communicate with other nearby units and accessories, such as feed dispensers, cameras, motion sensors, drones, one or more user interfaces, such as, e.g., one or more smart phones or other digital interface, etc. Data is relayed to the user via long-range communication such as cellular, or other long-range mobile communication technologies, and also via short-range communication such as WiFi, BLUETOOTH®, or via a local connection via USB, or other communication interfaces. Devices and user interfaces of an animal feeding system or in a group or animal feeding systems may be linked (wired or wirelessly) so that a single unit within the group uses cell service or other Internet connection to communicate information for the entire group of devices or animal feeding systems. The various types of sensors may be connected and communicate with each other. The sensors may also be configured to detect movement at specific locations, and the controller may thereafter relay the detected movement to one or more user interfaces.

The scheduled actions for an animal feeding system, including the devices and accessories thereof, can be set in reference to sunrise and sunset and also correlated to the exact time according to each feeding system's global positioning. Thus, the animal feeding system or systems can be universally programmed to feed at sunrise and sunset and these feeding times are adjusted by a controller of the animal feeding systems to the actual sunrise and sunset times per the physical location, such as GPS location, of each animal feeding system. An application on a computing device, such as a smart phone, of the user can display the exact time an animal feeding system will operate in addition to times that are in reference to sunrise and sunset. Thus, a user can set feeding times in reference to sunrise and sunset and a user-friendly application can tell the user exactly what time the animal feeding system or systems will activate in reference to sunrise and sunset.

Referring to FIG. 1, illustrated is a block diagram of an embodiment of an animal feeding system 100 constructed according to principles of the disclosure. The animal feeding system 100 includes a hopper 105 connected to a stand or frame 101. The hopper 105 is a container for receiving feed therein. The animal feeding system 100 includes a controller 110 configured to control a feeding schedule, at least one sensor 115, and a communications module 120. A power supply 125 is connected with the controller 105. The controller 110, sensor 115, communications module 120, and power supply 125 may be housed together within the hopper 105, or may be coupled in a weather resistant housing on the exterior of the hopper 105. In one embodiment, hopper 105 may be positioned above a dispenser 130 (or may be called a spreader) for dispensing the feed. A gate 135, in one embodiment an actuator, may be controlled by a motor 140, connected with controller 110 via a motor driver 145, for opening and closing the gate 135 to control the flow of feed from the hopper 105 to the dispenser 130, and in some embodiments, the gate 135 may be able to control the direction of the feed exiting the dispenser 130. The feed may be a solid, liquid, or even gaseous feed. The gate 135 (actuator) may be hydraulic, pneumatic, or electrical.

Types of feeding dispensers that may be used with the animal feeding system 100 may include: rotary, dump or trap door type, a trough that opens a door for a specific length of time before closing, and a pneumatic cannon to dispense feed. In one embodiment, the dispenser 130 may be a mechanical spreader, such as a centrifugal spreader. In an alternative embodiment, the dispenser 130 includes a chute type system where the controller opens/closes a door/slot instead of a centrifugal type spreader. Another type of dispenser may be a canon-type spreader. Those skilled in the art will understand that any type of animal feeding dispenser may be used with animal feeding system 100.

The controller 110 includes at least a processor and a memory and is operatively connected with the at least one sensor 115 and the communications module 120. The communications module 120 may include antennas, hardware, and may include a processor configured to facilitate wireless communication (long-range short-range, or both) with remote devices and at least one user interface. The communications module 120 may also facilitate communication with sensors and other components near the animal feeding system 100 that are communicatively connected with the animal feeding system 100. The communication coupling can be wireless or wired.

In one embodiment, the at least one sensor 115 may comprise an infrared hopper level sensors, one or more accelerometers to sense motion, and may also include one or more photo sensors. The animal feeding system 100 may have multiple sensors according to the location and type of animal being fed by the animal feeding system 100. Thus, the animal feeding system 100 is an animal feeder but includes additional functionality that merely feeding animals.

The power supply 125 may be, in one embodiment, a high capacity storage battery connected to a source of renewable energy, such as a windmill or a solar cell, but other long-life power supplies known to those skilled in the art may be used.

Figure 2:
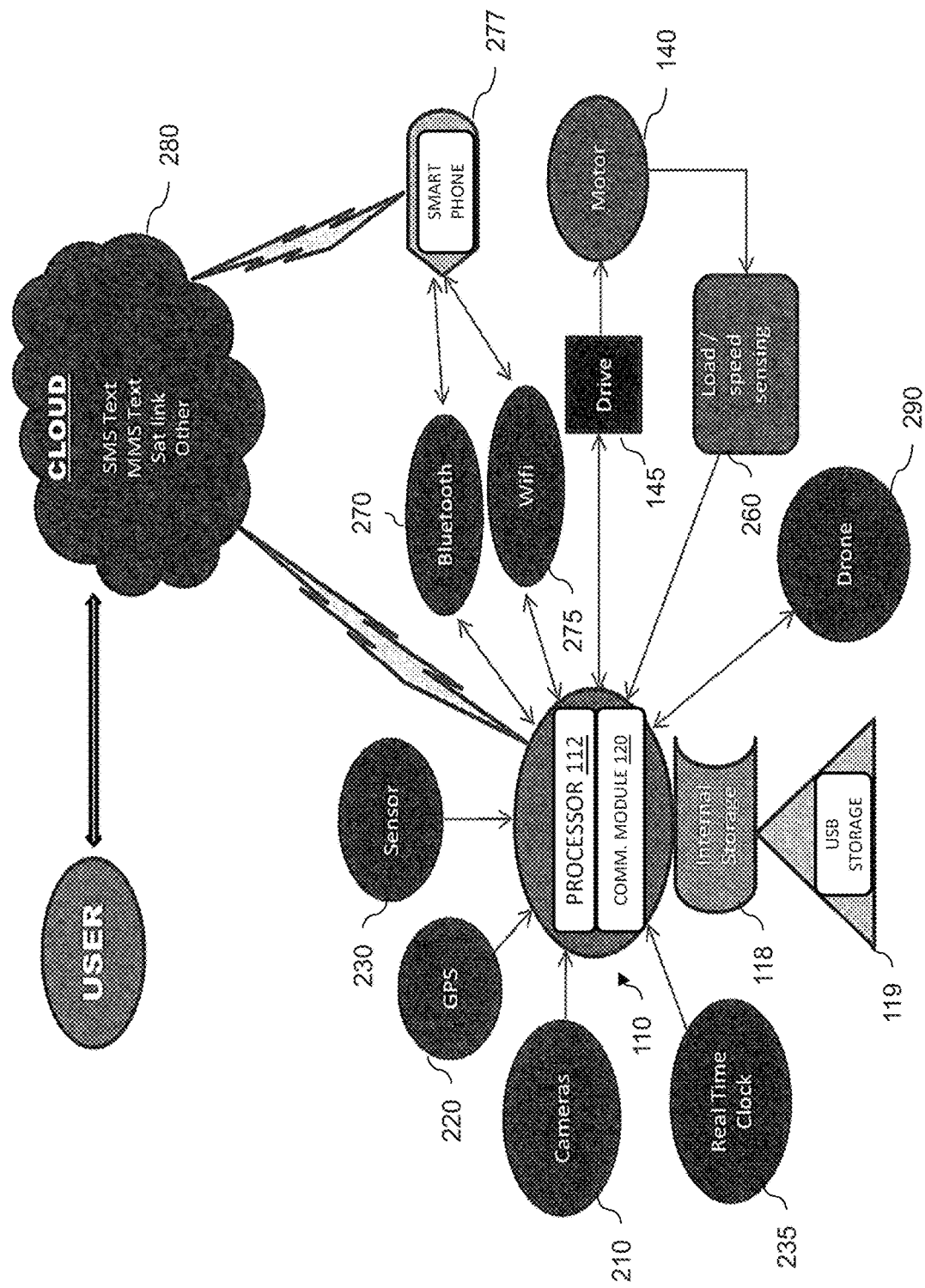
FIG. 2 illustrates controller system according to principles of the disclosure that may be used with the automated animal feeding system of FIG. 1.

FIG. 2 illustrates a diagram of a network of devices and features that the controller 110 can communicate with according to the principles of the disclosure. The controller 110 can be configured to communicate with these devices for controlling both feeding times at the animal feeding system 100, and sending and receiving information regarding the animal feeding system 100. The controller 110 includes a processor 112, the communications module 120, and internal storage 118. The processor 112 is programmed with a set of logic instructions configured to control features of the animal feeding system 100 based on at least certain inputs including a time of day, preprogrammed timing instructions, inputs from sensors, error conditions, and other inputs needed for controlling and maintain certain aspects of the animal feeding system 100. The communications module 120, or communications interface, enables both short-range and long-range wireless data communication with "the cloud" via various communications methods, such as, e.g., SMS text, MMS text, satellite link, or other communication modes, such as a fiber optic cable or radio frequency networks.

The controller 110 can accept and store video streaming input from various features relative to the feeder, such as remote cameras 210, data from a global positioning system (GPS) location device 220, and input from a sensor 230 or a variety of sensors, such as motion sensors, infrared sensors, photo sensors, and microphones. The controller 110 can also receive time data from a clock 235. The controller 110 may also receive instructions from instructions pre-programmed into an internal memory or storage 118, or provided to the internal storage 118 via an external source. The internal storage 118 can include a USB port 119 for coupling to a USB memory stick. The controller 110 also accepts input from local machine sensors, such as represented by element 260 in FIG. 2, which monitor operating indicators of the motor 140, such as current draw, motor speed, and dispersion pattern of the feed, hopper level, temperature, light, rainfall, and a battery contact plate, which indicates the presence or absence of a battery. The controller 110 can also control operation of the motor 140 via the motor driver 145.

The user may communicate with the controller 110 through a short-range communications such as BLU-ETOOTH®, WiFi, represented by elements 270 and 275 in FIG. 2, or through a USB connection via Ethernet protocol. The user can employ a smart phone 277 or another type of computing device, to communicate via BLUETOOTH® 270 and WiFi 275 connections. In addition, the user can communicate with the controller 110 via a communications network represented by the cloud 280. The communications can be via text, including SMS and MMS, and can be over a satellite link or other wireless or wired links.

The controller 110 can also communicate with external devices of the animal feeding system 100, such as represented by a drone 290 in FIG. 2. The controller 110 can receive inputs from all or some of the devices in FIG. 2 and make decisions for operating the animal feeding system 100 based on the inputs. For example, the drone 290 or trail sensors can indicate approaching animals and the controller 110 can use this information to, for example, dispense food. The controller 110, or a processor thereof, can further communicate with a resource management system that is configured to control multiple feeders.

Figure 3:
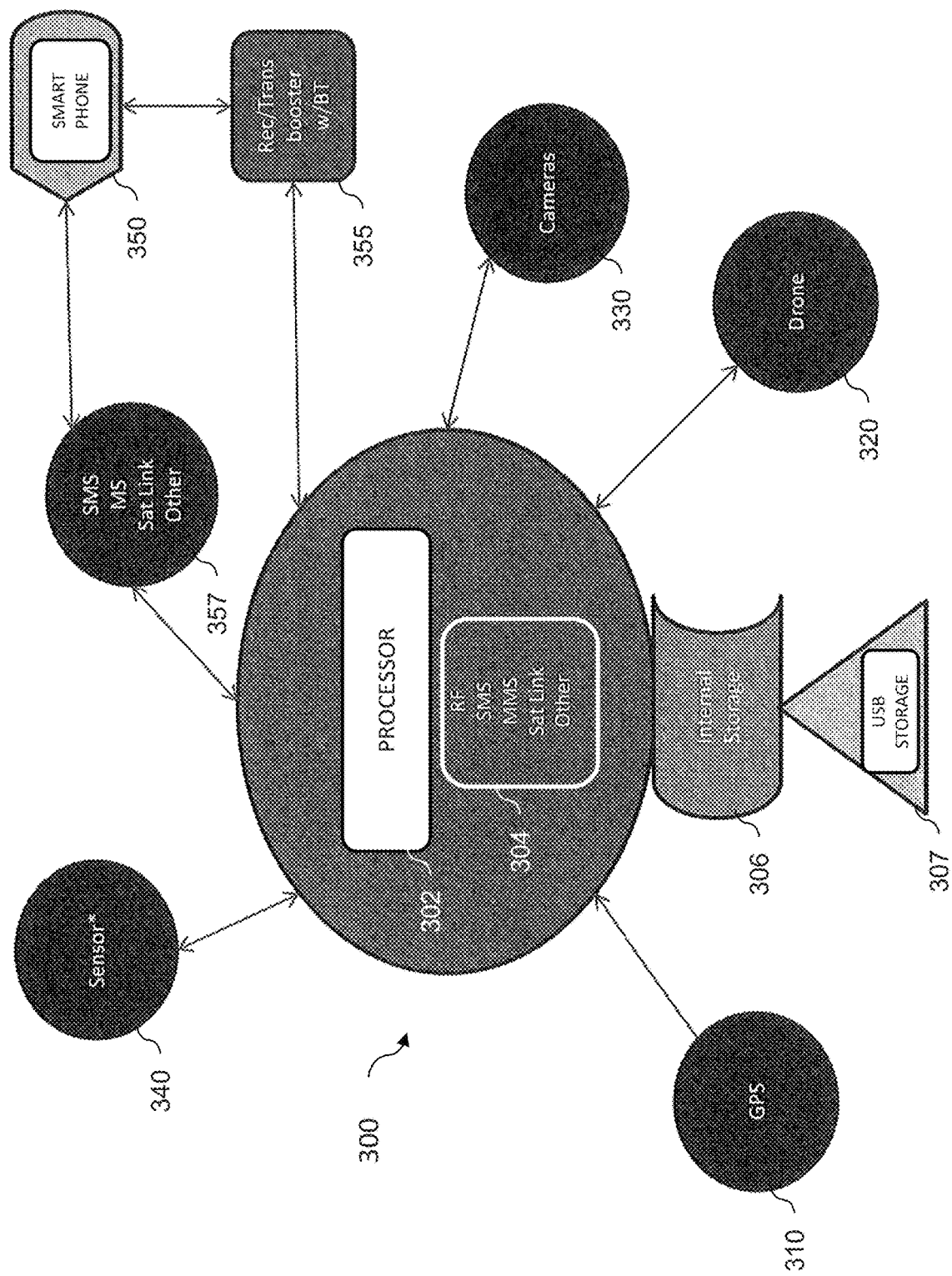
FIG. 3 illustrates a communication and electronic feeding system according to the principles of the disclosure that may be used with the animal feeding system shown in FIG. 1.

FIG. 3 illustrates a diagram of an example of a resource management system 300 constructed according to the principles of the disclosure. The resource management system 300 is capable of coordinating the functions of several animal feeding systems at once. Accordingly, the resource management system 300 can include a processor 302, an interface 304, and a memory or internal storage 306. The processor 302 can be configured to control or coordinate the various functions and devices of multiple feeders. The interface 304 can be a communications interface for communicating with the controllers of multiple animal feeding systems, such as the controller 110. The controllers can communicate with the resource management system 300 via a communications network, such as "a cloud," and the interface 304. The communications can be through RF, SMS, MMS, satellite link, or other data communications methods. The internal storage 306 can be used to store logic that directs the operation of the processor 302 to perform the coordination. The internal storage 306 can include a USB port 307 to receive data via a USB memory stick.

The resource management system 300 can communicate with the various controllers and the devices associated with the animal feeding systems. As illustrated, the resource management system 300 can receive global positioning information from a GPS location device 310; this can be used, for example, to control feeding times for the connected feeders. The resource management system 300 is also configured to communicate with drones, represented by drone 320, to control and orchestrate drone flight and navigation. The resource management system 300 also includes communication sufficient to control video cameras, represented by cameras 330, and sensors, represented by sensor 340. The sensors can be employed to determine feed capacity in a hopper, trail monitoring devices, light sensors, etc. The various sensors can be linked together to increase the communication range between the sensors and feeder controllers or the resource management system 300. A user can also communicate with the resource management system 300 via the interface 304 and a computing device, represented by a smart phone 350, and via transceivers for Bluetooth 355 or other communications 357, such as WiFi and/or satellite communications. Multiple animal feeding stations can be linked together to increase the communication range and communicating with a user. As such, a user can connect to a first animal feeding system and then communicate to other animal feeding systems via the first animal feeding system.

Figure 4:
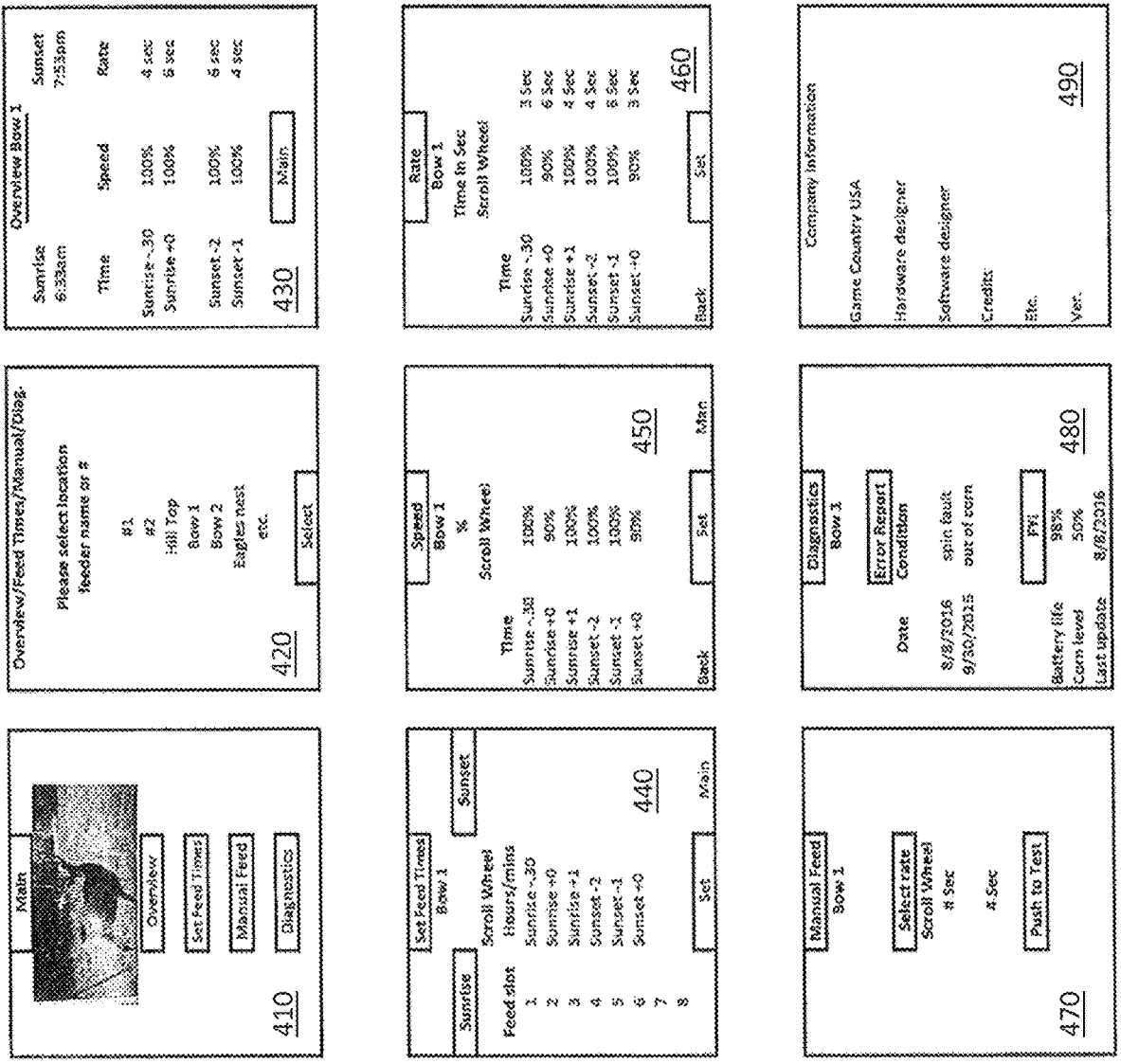
FIG. 4 illustrates data entry interfaces according to the principles of the disclosure than may be used with the animal feeding system of FIG. 1.

Referring now to FIG. 4, there is shown examples of instructions entry screens 400 for controlling the operation of an animal feeding system or systems. The instruction entry screens 400 may be displayed on a user interface device such as a display at a feeding system, or may be a remote user interface, such as on a user's computing device, tablet, or smart phone. Smart phone 277 of FIG. 2 is an example of a remote user interface. The instruction entry screens 400 can be or be part of an application running on a remote user interface. The instructions entry screens 400 can be used to control a single feeding system or multiple animal feeding systems via a resource management system, such as resource management system 300. Once instruction information is entered, the instructions are communicated with a controller of a feeding system and compiled by the processor into instructions implemented by the controller. Controller 110 is an example of such a controller. Select and set buttons can be used to select and set options from the different screens.

The instruction entry screens 400 include multiple screens including a main menu screen 410 of functions including an overview of the feeding systems, setting feed times, requesting a manual feed, and diagnostics. Choosing any of these functions from the main menu screen 410 prompts a data entry screen configured according to the function selected. Clicking an option on the main menu screen 410 allows a user to select a feeder by location, name assigned, number assigned, or combination thereof.

In a feeding system having multiple animal feeding systems, overview screen 420 provides a listing of various locations for feeders. The feeding systems can be controlled by via a resource management system using the instruction entry screens 400. Choosing any of the locations provides a location overview screen, such as location overview screen 430 for location Bow 1. The location and overview screen 430 includes accurate sunrise and sunset times for the particular location, feeding times, dispersion speeds, and dispersion rates.

The set feed times screen 440 provides selections for setting the feed times for feeder locations. The set feed times screen 440 includes sunrise and sunset options and scroll wheels for selecting feeding slots and activation times to set for feed distribution. Once a feed slot is selected (via set button) a speed screen 450 is provided that allows the selection of a dispersion speed which controls a percentage speed for dispersing feed. This can be related to the sunrise and sunset times, plus or minus a time interval.

Setting the speed (via set button) similarly provides a rate screen 460 that allows the option to select a time for the dispersion of feed. The time can be in seconds. This can be the time of how long a motor is to run. The feed time may also include the controller controlling how long the gate stays open and/or additional controlling a dispenser.

Setting the feed time may also include instructing a feeder to feed at sunrise and sunset determined by the feeding system's physical location, according to a GPS receiver located at the feeder, or the global position programmed into the controller. The controller may be configured to receive regular weather data updates regarding the feeder's position and adjust the feeding times accordingly. For example, in March, sunrise may be at 6:44 am and sunset at 6:15 pm, but in July, sunrise may be at 6:10 am and sunrise at 8:02 pm. The weather data can be received via a resource management system.

Choice of the manual feed option results in manual feed screen 470 that provides a scroll wheel to select the rate and time duration a manual feed distribution. Thus, the instruction entry screen 400 can be used to schedule feeding times and to activate manual feeding.

Selecting a diagnostics option provides a diagnostic screen 480 that includes an error report which can include "spin fault" or a "jam condition" to show motor drive problems and "out of feed" conditions. The diagnostics report also includes battery life, feed level, and the date that the instructions were last updated as well as recent hardware, software, or firmware updates. A company screen 490 can also be provided that provides pertinent information about the feeders or application.

Figure 5:
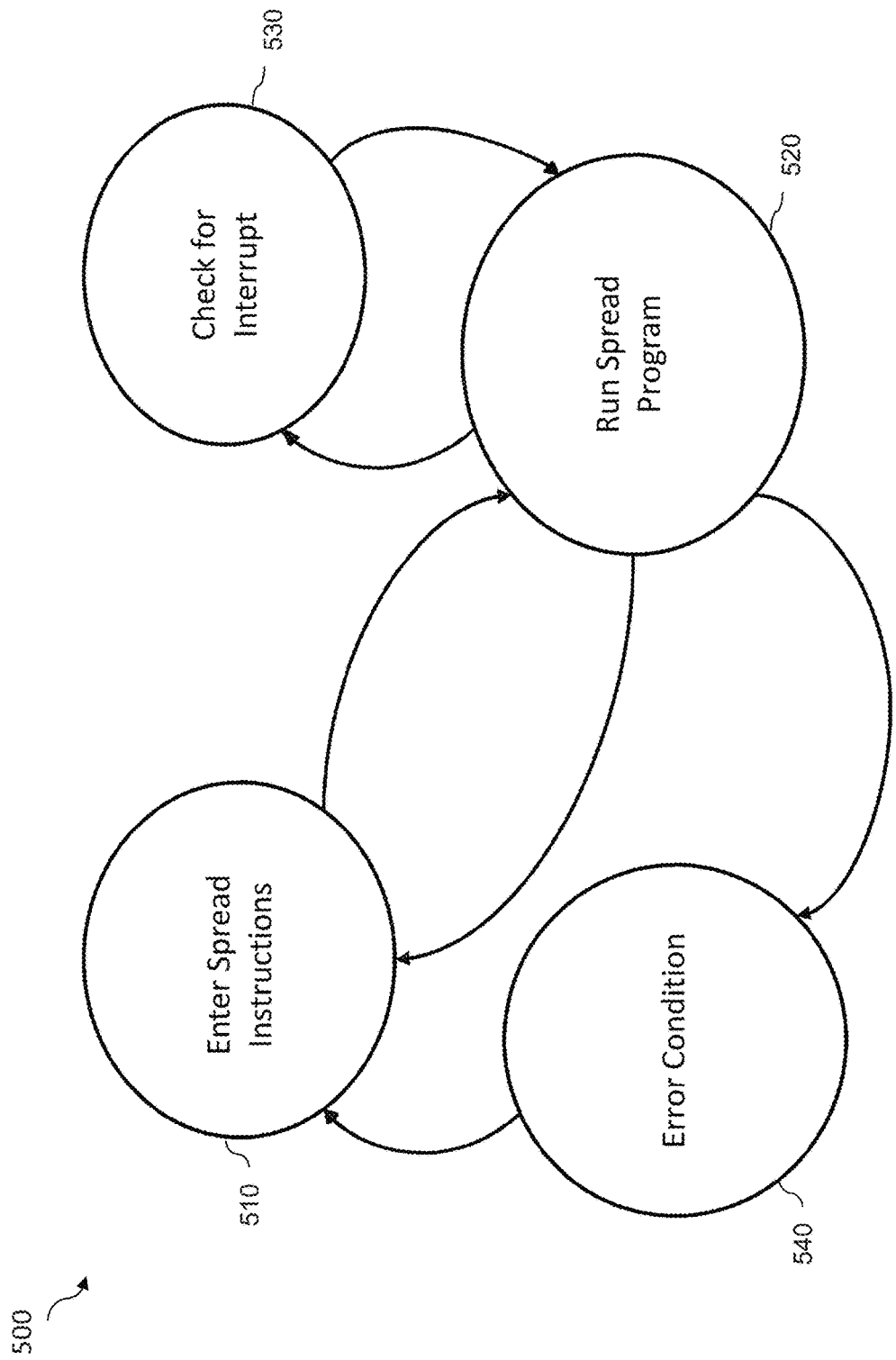
FIG. 5 illustrates an example of state chart for controller according to principles of the disclosure.

FIG. 5 illustrates an example of a state chart 500 for a controller, such as controller 110. The state chart 500 includes an "enter spread instructions state" 510, which displays the main menu on the user's device. The enter spread instructions state 510 is an interactive status of the controller in which menus are displayed and user instructions and data are received in response to menu selections and data entry. In the enter spread instructions state 510, the user identifies the schedule for the system based on sunrise and sunset times. When instructions are received from the user, such as via smart phone, to run a spread program, the user device communicates instructions to the cloud which downloads them to the controller whereupon the controller enters the "run spread instructions state" 520. While in the run spread instruction state 520, the controller periodically enters the "check for interrupt state" 530. In the check for interrupt state 530 the controller periodically references an interrupt table to check for an interrupt from the communications devices, sensors, and for error conditions reported by the motor drive, battery power supply, feed gate, or hopper level monitor. In one embodiment, an interrupt can include a message from the communications module to return to the enter spread instructions state 510. The controller also includes an "error condition state 540", which when entered, requires physical attention for further instructions. Such error conditions may occur upon a sensor report of massive damage or movement of the machine.

In some embodiments, animal feeding system 100 may be a part of a system of feeding systems, having multiple feeders at multiple positions. The multiple feeding systems may each have their own controller and/or may be connected with a central controller. Additionally, the multiple animal feeding systems can be communicatively coupled together allowing communication to one feeding system via another feeding system.

In other embodiments, an application "app" may be configured for use on a user interface such as a smart phone or computing device, wherein the app may provide prompts and a menu for the user to program the feeding system remotely, check the status of feeder systems, and various other prompts and interfaces that may be programmed into the app such that the user interface may interface with the controller.

In some embodiments, the feeder system also has drones connected with the controller such that a user may view and track wildlife, such as deer or wild game, that use the feeder or for collection after being shot. The disclosed animal feeding system and resource management system provide more than just an animal feeder but instead provide a system that controls multiple aspects to improve the experience of a hunter or hunters.

Those skilled in the art to which this application relates will appreciate that other and further additions, deletions, substitutions and modifications may be made to the described embodiments.

As will be appreciated by one of skill in the art, the disclosure or parts thereof may be embodied as a method, system, or computer program product. Accordingly, the features disclosed herein, or at least some of the features, may take the form of an entirely hardware embodiment, an entirely software embodiment (including firmware, resident software, micro-code, etc.) or an embodiment combining software and hardware aspects all generally referred to herein as a "circuit" or "module." Some of the disclosed features may be embodied in or performed by various processors, such as digital data processors or computers, wherein the computers are programmed or store executable programs of sequences of software instructions to perform one or more of the steps of the methods. Thus, features or at least some of the features disclosed herein may take the form of a computer program product on a non-transitory computer-usable storage medium having computer-usable program code embodied in the medium. The software instructions of such programs can represent algorithms and be encoded in machine-executable form on non-transitory digital data storage media.

Thus, portions of disclosed examples may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

The invention claimed is:

1. An animal feeding system comprising:
   a container for receiving feed therein;
   a sensor;
   a controller;
   a communications module coupled with the controller and configured for both short-range and long-range communication with at least one user interface and the at least one sensor;
   a dispenser for dispensing feed; and
   a gate connected with a motor, the gate for controlling the flow of food from the container to the dispenser, the gate controlled by a motor;
   wherein the controller is configured to automatically regulate feeding times according to the location of the animal feeding system and the corresponding sunrise and sunset times of the location.

2. The animal feeding system as recited in claim 1 wherein the controller is further configured to receive inputs from the at least one sensor and the at least one user interface and further employ the inputs to regulate the feeding times.

3. The animal feeding system as recited in claim 1 wherein the controller is programmed with a global positioning locator.

4. The animal feeding system as recited in claim 3, wherein the controller is configured to receive weather updates based on the global positioning locator and update the feeding times based on the received weather updates.

5. The animal feeding system as recited in claim 1 wherein the dispenser is a mechanical spreader.

6. The animal feeding system as recited in claim 1 wherein the sensor is a motion sensor for detecting motion near the animal feeding system.

7. The animal feeding system as recited in claim 1 wherein the sensor is for detecting a level of feed in the container.

8. A resource management system for controlling multiple animal feeding systems, comprising:
   a communications interface configured to communicate with controllers of multiple animal feeding systems, wherein each of the multiple animal feeding systems has a unique location; and
   a processor configured to direct the controllers to automatically regulate feeding times according to each unique location and the corresponding sunrise and sunset times of the unique location.

9. The resource management system as recited in claim 8 wherein the communications interface receives settings for the feeding times from a user via the communications interface and the processor is further configured to control the feeding times according to the settings.

10. The resource management system as recited in claim 9 wherein the settings are different for at least one unique location.

11. The resource management system as recited in claim 8 wherein each unique location is determined by a global positioning system data.

12. The resource management system as recited in claim 8 wherein the processor is further configured to control the operation of devices associated with the animal feeding systems.

13. The resource management system as recited in claim 9 wherein the devices include cameras, sensors, and drones.

14. The resource management system as recited in claim 8 wherein the processor is configured to automatically determine a time of sunrise and sunset for each unique location based on GPS data.

15. A computer program product having a set of operating instructions stored on a computer readable medium that direct operation of at least one animal feeding system, the instructions comprising:
   receiving a location of an animal feeding system;
   receiving feeding settings for the animal feeding system that include a feeding speed and a feeding rate;
   determining sunrise and sunset for the location employing global positioning data; and
   automatically providing feed at the animal feeding system based on the sunrise and sunset and the feeding settings.

16. The computer program product as recited in claim 15, wherein the receiving the feeding settings, the determining, and the automatically providing the feeding instructions are performed for multiple animal feeding systems.

* * * * *